United States Patent Office 3,705,202
Patented Dec. 5, 1972

---

3,705,202
ALKYLATION OF AROMATICS WITH OLEFINS
Stephen N. Massie, Palatine, Ill., assignor to Universal Oil Products Company, Des Plaines, Ill.
No Drawing. Filed May 12, 1971, Ser. No. 142,819
Int. Cl. C07c 3/52
U.S. Cl. 260—671 C
18 Claims

ABSTRACT OF THE DISCLOSURE

An alkylatable aromatic hydrocarbon is alkylated with an olefinic hydrocarbon at a temperature in the range from about 45° F. to about 600° F. in the presence of a catalyst comprising a molybdenum-carbon monoxide compound in which the molybdenum is present in the compound in a zero valence state.

BACKGROUND

This invention relates to a process for alkylating an alkylatable aromatic hydrocarbon with an olefinic hydrocarbon. More specifically, this invention relates to a process for producing an alkylaromatic hydrocarbon from an alkylatable aromatic and an olefin in the presence of a catalyst comprising a molybdenum-carbon monoxide compound in which the molybdenum is present in a zero valence state.

Alkylaromatic compounds are useful as raw material in the production of polymers and resins. For example, ethylbenzene may be dehydrogenated to form styrene, which can be polymerized to form a commonly used plastic. Similarly, cumene may be oxidized to form phenol, which is used to provide phenolic resins. In another aspect, alkylaromatics having $C_9$–$C_{20}$ alkyl side chains are useful in the preparation of detergents. Thus, a process for producing alkylaromatics provides a method for obtaining useful and economically desirable products.

BRIEF DESCRIPTION OF THE INVENTION

Therefore, it is an object of this invention to provide a process for producing an olefin-aromatic hydrocarbon reaction product.

Another object of this invention is to provide a process for alkylating an alkylatable aromatic hydrocarbon with an olefinic hydrocarbon utilizing a catalyst comprising a compound of molybdenum and carbon monoxide.

In an embodiment, this invention relates to a process for alkylating an alkylatable aromatic hydrocarbon with an olefinic hydrocarbon to produce an alkylation reaction product which process comprises contacting said aromatic hydrocarbon with said olefinic hydrocarbon and with a catalyst comprising a molybdenum-carbon monoxide compound, in which the molybdenum is present in a zero valence state, in an alkylation zone at alkylation conditions, and recovering said alkylation reaction product in the effluent from said alkylation zone.

In one limited embodiment, this invention relates to a process for producing cumene and polyisopropylbenzenes which comprises contacting benzene with propene and with a catalyst comprising molybdenum hexacarbonyl in an alkylation zone at a temperature between about 45° F. and about 500° F. and a pressure between about one atmosphere and about 200 atmospheres and recovering said cumene and said polyisopropylbenzenes in the effluent from said alkylation zone.

Various other aspects, objects and embodiments of the present invention will become apparent from the following detailed description.

DETAILED DESCRIPTION OF THE INVENTION

The alkylation conditions appropriate to the process of the present invention include a temperature in the range from about 45° F. to about 600° F. and a pressure in the range from about 1 atmosphere to about 200 atmospheres or more. Preferably, the pressure in an alkylation zone in an embodiment of the present invention will be held at a level sufficient to maintain the major portion of the reactants in the liquid phase. Pressures greater than atmospheric may be obtained by employing a gas inert in the reaction such as nitrogen, argon or methane. Carbon monoxide may also be employed to produce superatmospheric pressure in the alkylation zone, although an inert gas may be preferred. Partial pressures of any or all of the above-noted, or other, suitable gases may be utilized in combination to provide a suitable pressure in the alkylation zone in the present process. Alkylation conditions also preferably include the absence in the alkylation zone of certain compounds, comprising ligands, for example, triphenylphosphine, which inhibit the desired reaction by forming strong complexes with molybdenum-carbon monoxide compounds. In embodiments of the present invention in which an aromatic hydrocarbon and $C_2$–$C_{20}$ mono-olefins are utilized as reactants, it is preferred that a temperature between about 200° F. and about 450° F. be maintained at alkylation conditions in an alkylation zone. The process of this invention may be carried out in the presence of paraffins and/or naphthenes, which are substantially inert in the reaction.

Alkylatable aromatic hydrocarbons which may suitably be utilized in the process of this invention include benzene and alkylaromatics. Aromatic compounds having only one alkyl group attached to the aromatic ring are preferred over aromatics having a larger number of side chains. Particularly preferred are benzene, toluene and cumene.

Olefinic hydrocarbons suitable for use in the present invention include the $C_2$–$C_{20}$ mono- and poly-olefins with the exception of iso-olefins which are not suitable for use in the present inventive process. Linear olefins are preferred over branched-chain olefins, and olefins having an alpha-situated double bond are preferred over olefins which have a more internally situated double bond. Specifically, olefinic hydrocarbons which may suitably be employed in the present inventive process include straight- or branched chain olefins which have at least one ethylenically unsaturated bond between two carbon atoms therein, which two carbon atoms each have at least one substituent atom consisting of hydrogen. Thus, olefins of the formula

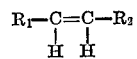

are suitable, where either $R_1$, $R_2$, or both may be either an alkyl group or a hydrogen atom.

The process of this invention may be embodied in a batch reaction scheme or a continuous reaction scheme. The molar ratio of alkylatable aromatic reactant to olefinic reactant in any specific embodiment will depend on the alkylation reaction product desired from the process in the particular embodiment. For example, when benzene and propylene are utilized in an embodiment of this invention, a molar excess of benzene over propylene in the alkylation zone will result in the creation of an alkylation reaction product comprising primarily cumene; an excess of propene over benzene will result in a reaction product comprising primarily polyisopropylbenzenes. An example of an alkylation zone suitable for an embodiment of the process of this invention, utilizing a batch reaction scheme, is a rotating autoclave which will contain the reactants and catalyst at alkylation conditions. The alkylation reaction product produced in the process of this invention can be separated from the effluent of an alkylation zone by any of various means known to the hydrocarbon processing art. For example, the effluent from an autoclave as described above may be fractionated, distilled, solvent extracted, crystallized, etc., to recover the desired alkylaromatic products. Specific examples of the alkylation reaction products which can be produced in the process of the present invention are, for example, ethylbenzene, the diethylbenzene isomers, cumene, the diisopropylbenzene isomers, butylbenzenes, pentylbenzenes, hexylbenzenes, etc., cymene, diisopropyltoluene, etc., diphenylalkanes, phenylalkylnaphthanes, etc.

The molybdenum-carbon monoxide compound to be utilized in the present process may comprise molybdenum hexacarbonyl or a complex of molybdenum, carbon monoxide and an aromatic hydrocarbon. It is thought that the mechanism of the alkylation reaction in the present process involves the formation of an intermediate complex comprising molybdenum, carbon monoxide and subsequent reaction of this complex in the alkylation. For example, in an embodiment wherein benzene is to be alkylated with ethylene, benzene, ethylene and molybdenum hexacarbonyl are contacted at alkylation conditions. The benzene and molybdenum-carbon monoxide compound interact to form benzene molybdenum tricarbonyl, which further interacts with ethylene, leading to the alkylation reaction product, ethylbenzene. Thus, it is contemplated that not only molybdenum hexacarbonyl but also, for example, benzene molybdenum tricarbonyl, toluene molybdenum tricarbonyl, o-xylene molybdenum tricarbonyl, m-xylene molybdenum tricarbonyl, p-xylene molybdenum tricarbonyl, cumene molybdenum tricarbonyl, mesitylene molybdenum tricarbonyl, etc., are suitable for use as the catalyst in particular embodiments of the process of this invention. The aromatic compound with which molybdenum and carbon monoxide are complexed need not be the aromatic compound which is to be alkylated in the process of the invention. For example, a catalyst comprising pentamethylbenzene molybdenum tricarbonyl may be utilized in an embodiment wherein benzene and propylene are to be alkylated. Preferred compounds include molybdenum hexacarbonyl and complexes comprising molybdenum, carbon monoxide and an aromatic hydrocarbon to be alkylated in the same process, e.g., benzene molybdenum tricarbonyl is preferred in an embodiment wherein benzene and propylene are to be reacted.

The catalytic activity of the molybdenum-carbon monoxide compound utilized as the catalyst in the process of this invention may be enhanced by carrying out the alkylation reaction in the presence of metallic iron or an alloy thereof. While not effective as an alkylation catalyst, the metallic iron or iron alloy serves to enhance the effect of the molybdenum compound by reducing the time required for formation of the alkylation reaction product. It is preferred that the metallic iron or iron alloy, utilized to enhance the effect of the molybdenum compound, be in a finely-divided state, so as to provide as large a surface area as possible. For example, fine stainless steel fibers may be introduced to an alkylation zone and contacted with an alkylatable aromatic hydrocarbon, an olefinic hydrocarbon, and a molybdenum-carbon monoxide compound. I have found that the presence of these steel fibers substantially shortens the reaction time necessary to produce the same yield of alkylation reaction product as would be produced under the same conditions without introducing the fibers.

The catalytic effect of the molybdenum-carbon monoxide compound employed as the catalyst in this process may also be enhanced by contacting the reactants and catalyst in an alkylation zone in the presence of iron compounds which are soluble in the mixture of reactants. Suitable iron compounds include iron tetracarbonyl, diiron nonacarbonyl, iron pentacarbonyl, iron salts of higher molecular weight aliphatic and aromatic carboxylic acids, mono- and dicyclopentadienyl-iron compounds, etc. For example, I have found that by contacting an alkylatable reactant, an olefinic reactant and a molybdenum-carbon monoxide compound in an alkylation zone in the presence of iron carbonyl, the time required to produce an alkylation reaction product is substantially shorter than the time required to produce the same amount of reaction product when the iron carbonyl is not present.

I have also found that the process of this invention is favorably affected when the alkylatable aromatic hydrocarbon, olefinic hydrocarbon and molybdenum-carbon monoxide compound are contacted in an alkylation zone in the presence of a non-catalytic amount of a strong mineral acid such as sulfuric acid, hydrogen fluoride, hydrogen chloride, etc., or of other strong acids such as p-toluene-sulfonic acid, trifluoroacetic acid, etc.

The examples hereinafter given are intended to illustrate particular specific embodiments of the process of this invention. These examples are not intended to limit the process of this invention to the embodiments described, nor to limit the scope of the present invention to that of the examples. From the description hereinbefore provided, the broad scope of the invention and many other modifications and variations thereunder will be apparent to one skilled in the art.

Example I

In this specific embodiment of the process of the invention, 39.8 grams (0.51 mole) of benzene were placed in a glass-lined 850 ml. rotating autoclave with 1 gram (0.0038 mole) of molybdenum hexacarbonyl. The autoclave was sealed, and 42 grams (1 mole) of propylene were introduced therein. Sufficient nitrogen was charged to the autoclave to increase the pressure therein to 40 atmospheres. The temperature of the contents of the autoclave was raised to 285° F. and held at that level for 16 hours. The contents were then cooled to room temperature and the autoclave depressurized. The liquids remaining in the autoclave were removed and analyzed to determine their composition. It was found that 25%, by weight, of the benzene originally charged to the autoclave had been converted into cumene and diisopropylbenzenes. The distribution of the alkylation reaction products was found to be, by weight, 74% cumene, 1% o-diisopropylbenzene, 9.5% m-diisopropylbenzene, and 15.5% p-diisopropylbenzene.

Example II

In this specific embodiment of the process of the invention, 39 grams (0.5 mole) of benzene and 1.0 gram of molybdenum hexacarbonyl were placed in the autoclave described in Example I, and the autoclave was sealed. 28 grams (1 mole) of ethylene were charge to the autoclave to provide a pressure of 55 atmospheres. The contents of the autoclave were heated to 285° F. and maintained at that temperature for three hours. The contents were then heated to 360° F. and held at that temperature for 8 hours. The contents were then returned to room temperature, and the autoclave depressurized. The liquids remaining in the autoclave were withdrawn and analyzed to determine their compositions. It was found that they contained ethylbenzene.

Example III

In this specific embodiment of the process of the invention, 92 grams (1 mole) of toluene and 1 gram of molybdenum hexacarbonyl were placed in the autoclave described in Example I and the autoclave was sealed. 42 grams (1 mole) of propylene were charged to the autoclave and the pressure therein was raised to 40 atmospheres by the addition of nitrogen. The contents of the autoclave were heated to 360° F., held at that tempertaure for 16 hours and then returned to room temperature. The autoclave was depressurized, and the liquid content thereof were withdrawn and analyzed to determine their composition. It was found that 25%, by weight, of the toluene charged to the autoclave had been converted into cymene and diisopropyltoluenes, which 75%, by weight, of the alkylaromatic reaction products being cymene.

Example IV

In this specific embodiment of the process of the invention, 78 grams (1 mole) of benzene, 56 grams (1 mole) of 2-butene, and 1 gram of molybdenum hexacarbonyl were placed in the glass liner of the autoclave described in Example I, which liner was cooled with Dry Ice. The autoclave was sealed, and the pressure therein was raised to 40 atmospheres by the addition of nitrogen. The contents of the autoclave were heated to 360° F., held at that temperature for 16 hours, and cooled to room temperature. The autoclave was depressurized, and the liquids remaining in the autoclave were withdrawn and analyzed to determine their composition. The liquids were found to contain sec-butylbenzene.

Example V

In this specific embodiment of the process of the invention, 60.1 grams (0.5 mole) of cumene and 1 gram of molybdenum hexacarbonyl were placed in the liner of the autoclave described in Example I. The autoclave was sealed and 42 grams (1 mole) of propylene was charged to the autoclave. The pressure in the autoclave was increased to 40 atmospheres by the addition of nitrogen. The contents of the autoclave were heated to 360° F., held at that temperature for 16 hours, and then cooled to room temperature. The autoclave was depressurized and the liquids remaining therein were recovered. When these liquids were analyzed to determine their composition, they were found to contain diisopropylbenzenes.

Example VI

In this specific embodiment of the process of the invention, 78 grams (1 mole) of benzene, 56 grams (0.5 mole) of 1-octene and 1 gram of molybdenum hexacarbonyl were charged to the liner of the autoclave described in Example I. The autoclave was sealed and nitrogen gas was charged to increase the pressure therein to 40 atmospheres. The temperature of the contents of the autoclave was raised to 255° F. and maintained at that level for 4 hours. The autoclave was then cooled to room temperature and depressurized. The contents remaining therein were recovered and analyzed to determine their composition. They were found to contain octylbenzenes.

Example VII

In this specific embodiment of the process of the invention, 39 grams (0.5 mole) of benzene, 1.0 gram of molybdenum hexacarbonyl and 2 grams of iron fibers are placed in the liner of the autoclave described in Example I. The autoclave is sealed and 42 grams (1 mole) of propylene are introduced therein. Nitrogen is charged to increase the pressure in the autoclave to 40 atmospheres. The contents of the autoclave are heated to 285° F., maintained at that temperature for 16 hours, and then returned to room temperature. The autoclave is depressurized and the contents remaining therein are withdrawn and analyzed to determine their composition. It is found that the weight percent of propylbenzenes produced is increased over that found in the embodiment described in Example I.

Example VIII

In this specific embodiment of the process of the invention, 39 grams (0.5 mole) of benzene, 1.0 gram of molybdenum hexacarbonyl and 1.0 gram of iron nonacarbonyl are placed in the liner of the autoclave described in Example I. The autoclave is sealed, and 42 grams (1 mole) of propylene are introduced therein. The pressure is raised to 40 atmospheres by the addition of nitrogen. The contents of the autoclave are heated to 285° F. and maintained at that temperature for 16 hours, then reduced to room temperature level. The autoclave is depressurized and the liquids remaining therein are removed and analyzed. It is found that the weight percent of propylbenzenes produced is increased over that found in the embodiment described in Example I.

Example IX

In this specific embodiment of the process of the invention, 39 grams (0.5 mole) of benzene, 1.0 gram of molybdenum hexacarbonyl and 1.0 gram of p-toluenesulfonic acid are placed in the liner of the autoclave described in Example I. The autoclave is sealed and 42 grams (1 mole) of propylene are charged. The pressure is increased to 40 atmospheres by the addition of nitrogen. The temperature of the contents of the autoclave is raised to 285° F., held at that level for 16 hours, and then reduced to room temperature level. The autoclave is depressurized and the liquids remaining therein are withdrawn and analyzed. It is found that the weight percent of propylbenzenes is increased over that found in the embodiment described in Example I.

I claim as my invention:

1. A process for producing an alkylation reaction product from an alkylatable aromatic hydrocarbon and an olefinic hydrocarbon which comprises contacting said alkylatable aromatic hydrocarbon with said olefinic hydrocarbon at alkylation conditions in the presence of a catalyst comprising a molybdenum-carbon monoxide compound, in which compound molybdenum is present in a zero valence state.

2. The process of claim 1 further characterized in that said alkylation conditions include a temperature of from about 45° F. to about 700° F. and a pressure of from about 1 atmosphere to about 200 atmospheres.

3. The process of claim 1 further characterized in that said catalyst is molybenum hexacarbonyl.

4. The process of claim 1 further characterized in that each molecule of said olefinic hydrocarbon contains at least one ethylenically unsaturated bond between two carbon atoms, both of said carbon atoms having at least one hydrogen atom substituent.

5. The process of claim 1 further characterized in that said alkylatable aromatic hydrocarbon has one alkyl group per molecule.

6. The process of claim 1 further characterized in that said alkylatable aromatic hydrocarbon is benzene.

7. The process of claim 1 further characterized in that said olefinic hydrocarbon is propene.

8. The process of claim 1 further characterized in that said olefinic hydrocarbon is ethylene.

9. The process of claim 1 further characterized in that said alkylatable aromatic hydrocarbon is toluene.

10. The process of claim 1 further characterized in that said alkylatable aromatic hydrocarbon is cumene.

11. The process of claim 1 further characterized in that said alkylation conditions include a temperature of from about 250° F. to about 600° F.

12. The process of claim 1 further characterized in that said alkylation conditions include the presence, in said alkylation zone, of iron in a zero valence state.

13. The process of claim 1 further characterized in that said alkylation conditions include the presence, in said alkylation zone, of an iron-containing compound.

14. The process of claim 13 further characterized in that said iron-containing compound is an iron carbonyl.

15. The process of claim 13 further characterized in that said iron-containing compound is a ferrocene.

16. The process of claim 13 further characterized in that said iron-containing compound is an iron salt of a carboxylic acid.

17. The process of claim 1 further characterized in that said alkylation conditions include the presence, in the alkylation zone, of an acid selected from the group consisting of sulfuric acid, hydrochloric acid, hydrofluoric acid, p-toluenesulfonic acid, and trifluoroacetic acid.

18. The process of claim 1 further characterized in that said catalyst comprises an aromatic hydrocarbon-molybdenum-carbon monoxide complex selected from the group consisting of benzene molybdenum tricarbonyl, toluene molybdenum tricarbonyl, cumene molybdenum tricarbonyl, o-xylene molybdenum tricarbonyl, m-xylene molybdenum tricarbonyl, p-xylene molybdenum tricarbonyl, and mesitylene molybdenum tricarbonyl.

References Cited
UNITED STATES PATENTS

| | | | |
|---|---|---|---|
| 3,033,778 | 5/1962 | Frilette | 260—671 C |
| 3,254,023 | 5/1966 | Miale et al. | 260—671 R |
| 3,594,430 | 7/1971 | Hervert | 260—671 C |

CURTIS R. DAVIS, Primary Examiner

U.S. Cl. X.R.

260—671 R